Oct. 16, 1945. W. O. NELSON 2,387,087
HOIST
Filed Nov. 30, 1942 4 Sheets-Sheet 1

Inventor
Walter O. Nelson
By Henry G. Dylvig
His Attorney

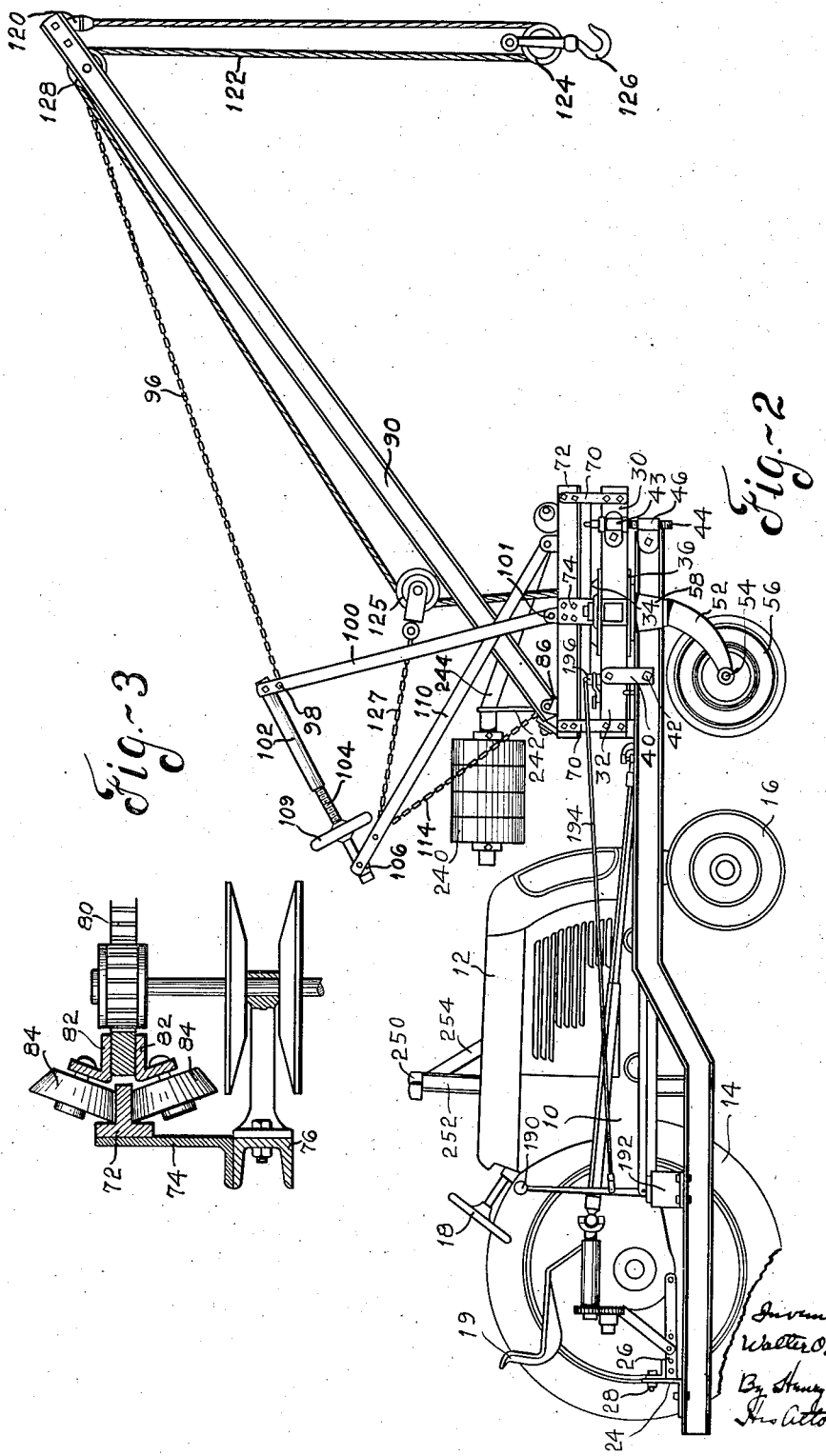

Oct. 16, 1945.  W. O. NELSON  2,387,087
HOIST
Filed Nov. 30, 1942  4 Sheets-Sheet 3

Inventor
Walter O. Nelson
By Henry G. Dybvig
Attorney

Oct. 16, 1945.  W. O. NELSON  2,387,087
HOIST
Filed Nov. 30, 1942  4 Sheets-Sheet 4
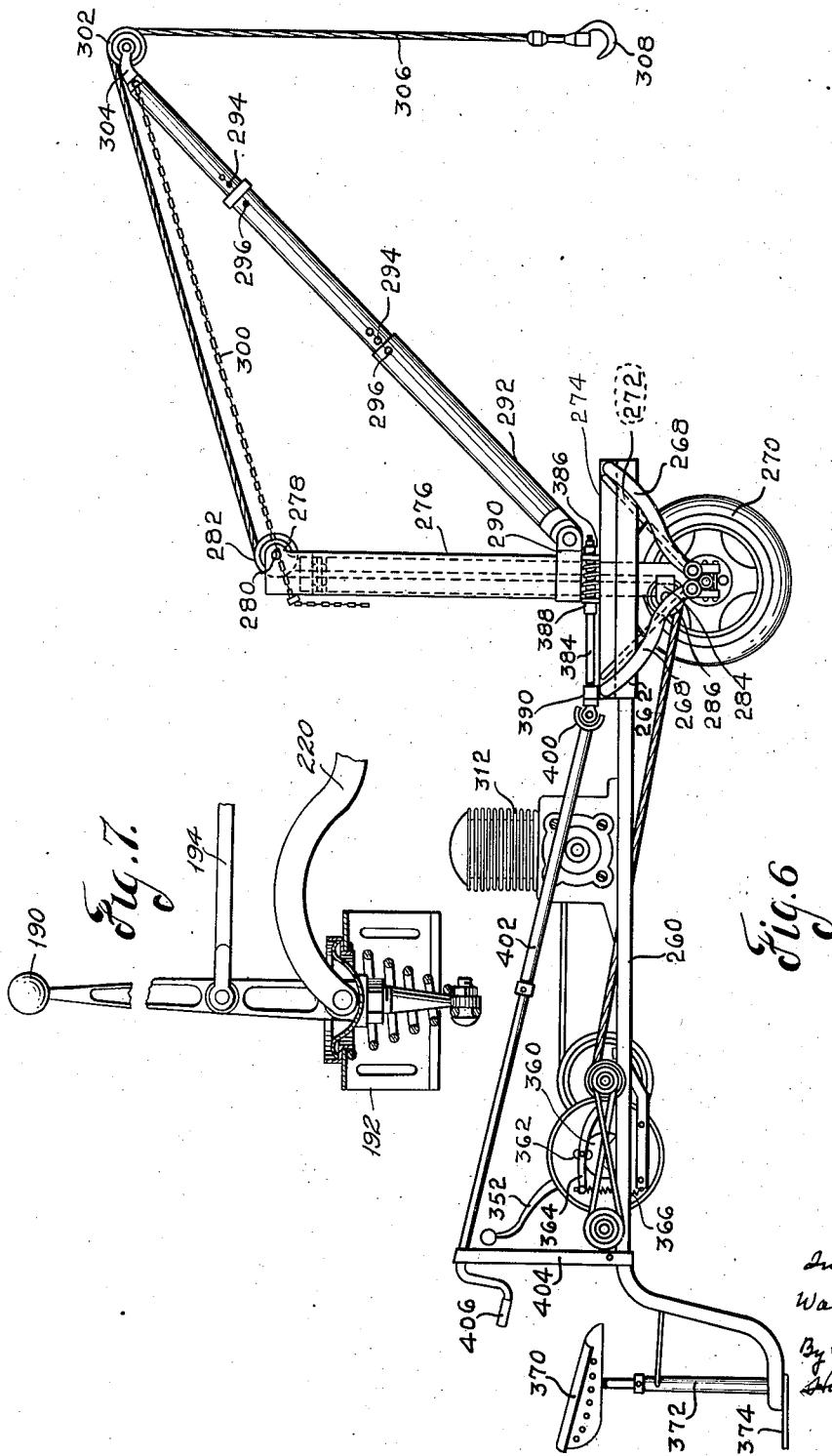

Patented Oct. 16, 1945

2,387,087

UNITED STATES PATENT OFFICE 2,387,087

HOIST

Walter O. Nelson, Oslo, Minn., assignor of one-half to Howard E. Baker, Chicago, Ill.

Application November 30, 1942, Serial No. 467,443

16 Claims. (Cl. 212—66)

This invention relates to a crane or hoist for hoisting and moving bodies and more particularly to a crane or hoist attachment for a portable power unit, such as a motor vehicle, a tractor, a truck and the like.

Numerous attempts have been made to provide an attachment to a tractor or a truck, so as to convert the tractor or truck into a hoisting device. These attempts, as far as known, broadly consist of a hoisting mechanism superimposed upon or fixedly attached to the chassis of the tractor or truck, as the case may be, either with or without braces or props for supporting the hoisting mechanism when in use. In the absence of braces or props, such hoisting devices have very definite limitations, in that if an attempt is made to lift the body located on the side of the tractor or truck, the tractor or truck, together with the hoisting device, will become overbalanced unless the weight of the body and its location is such that the center of gravity is located above and within the area bounded by the supporting wheels.

The term "tractor" is used throughout the specification to designate any motor vehicle such as a farm tractor, a caterpillar, a truck, an automobile or any other motor vehicle that is adapted for use with the hoisting device shown and described.

An object of this invention is to provide a self-supporting hoisting device adapted to be attached or hitched to a motor vehicle, such as a tractor or a truck.

Another object of this invention is to provide a hoisting device wherein the dimensions are so proportioned that the weight of the tractor or motor vehicle may be used as a counterpoise while hoisting.

Another object of this invention is to provide a self-supported hoisting device wherein the wheels of the hoisting device have a spread greater than the distance between the wheels of the motor vehicle.

Another object of this invention is to provide a flexible attachment between the self-contained hoisting device and the motor vehicle, so as to accommodate unevenness of the ground.

Another object of this invention is to provide a pusher type self-contained hoisting device, so that the hoisting device is located in front of the tractor and towed or pushed from the draw-bar to the rear of the tractor.

Another object of this invention is to provide a self-contained hoisting device that is energized from the motor of the tractor.

Another object of this invention is to provide a hoisting device having a turn-table that may be levelled.

Another object of this invention is to provide a self-contained hoist provided with wheels or bogies adapted to automatically align themselves with the direction of draft.

Another object of this invention is to provide a hoist having a counterpoise. oppositely disposed with respect to the weight.

Other objects and advantages reside in the construction of parts, the combination thereof and the mode of operation, as will become more apparent from the following description.

In the drawings, Figure 1 is a top plan view of the hoisting device attached to a tractor shown schematically.

Figure 2 is a side elevational view of the device shown in Figure 1.

Figure 3 is a fragmentary, cross sectional view taken substantially on the line 3—3 of Figure 1.

Figure 4 is a fragmentary, detail view of a portion of the device taken on the section line 4—4 of Figure 1.

Figure 5:
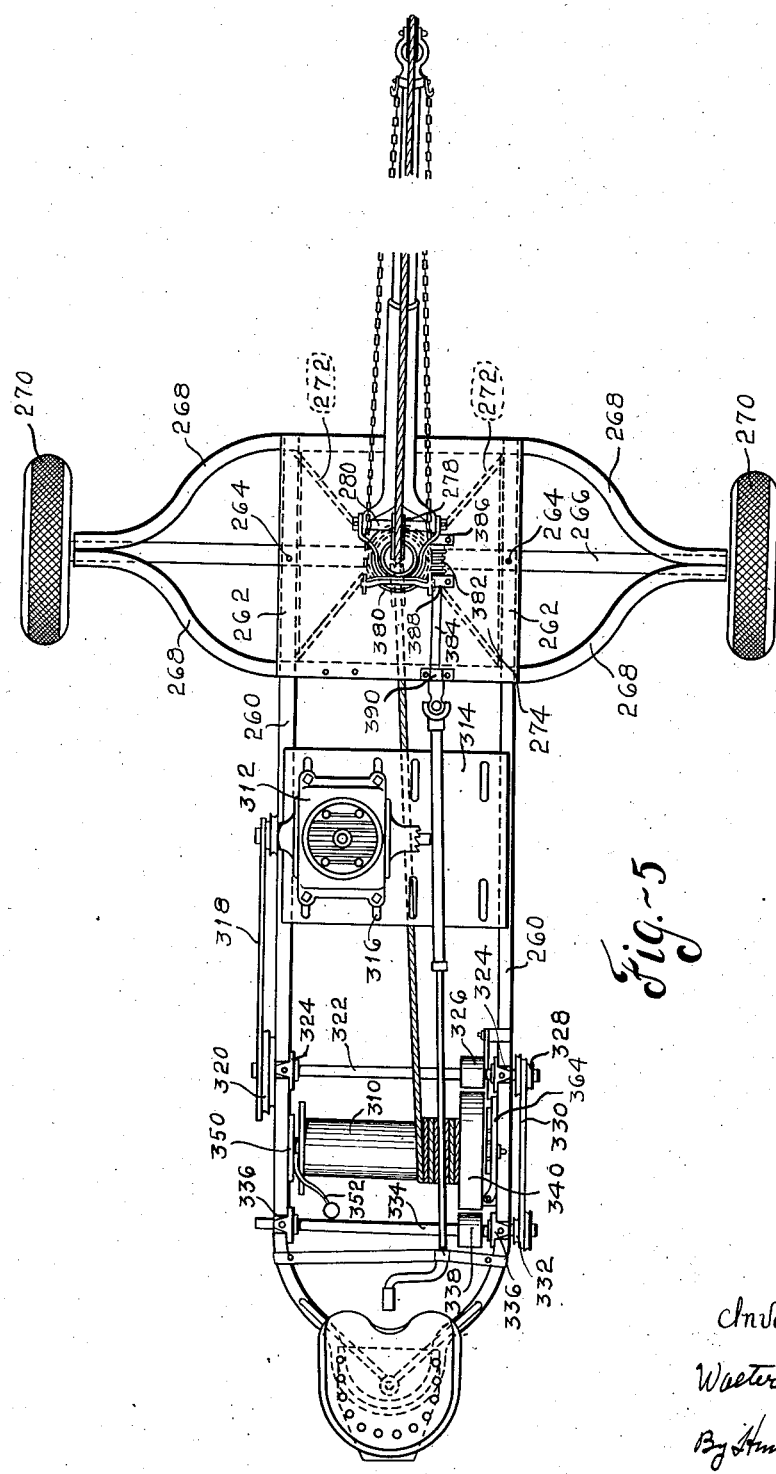

Figures 5 and 6 disclose top plan and side elevational views respectively of a modification.

Figure 7 is an enlarged view of the control mechanism with parts shown in section.

Referring to the drawings, the reference character 10 indicates the chassis of a tractor provided with a suitable motor 12, a pair of drive wheels 14, guiding wheels 16, which may be referred to as the front wheels, and a conventional steering wheel 18, manually controlled by the operator seated in the seat 19. The details of the tractor will not be described in their entirety. Only such portions thereof will be described as necessary to fully understand the operation of the hoisting attachment.

The frame of the hoisting device includes a pair of longitudinally extending thill-like frame members 20 and 22. The rear ends of members 20 and 22 are interconnected by an angle bar 24 attached to the draw-bar 26 of the tractor by means of a bolt 28. The front ends of members 20 and 22 are supported upon a pair of transverse frame members 30 and 32, so shaped as to form a substantially diamond-shaped frame. The ends of the transverse frame members 30 and 32 are held together by a pair of trapezoidal plates 34 and 36, one being located above and one below the transverse frame members 30 and 32. A pair of links 40, one on each side, fixedly attached to transverse frame member 32, are connected by a pivot or a bolt 42 to thill-like members 20 and 22. Transverse frame member 30 is connected by a turnbuckle including a collar 43 and a screw 44 threadedly engaging a nut 46 attached to the forward end of thill-like frame members 20 and 22. By adjusting the screw 44, it is possible to raise or lower the transverse member 30 with respect to the forward ends of the thill-like members 20 and 22, for the purpose of leveling the hoisting device, as will appear more fully later. The trapezoidal plates 34 and 36 are provided with apertures receiving shanks 50 fixedly attached to forks 52 supporting suitable axles or spindles 54, having journalled thereon the bogie wheels 56. The shanks 50 are free to rotate in the apertures in the trapezoidal plates 34 and 36. In order to provide proper clearance for the wheels, suitable spacing members 58 are positioned between the upper end of the forks 52 and the lower trapezoidal plate 36. This arrangement permits the wheels to align themselves with the direction of draft.

In order to maintain proper alignment between the tractor and the frame of the hoisting device, the frame members 20 and 22 are interconnected to the front end of the tractor by flexible means such as a pair of chains 60. One end of one of these chains is connected through a helical spring 62 to the thill-like frame member 20. The opposite end of this chain 60 is connected by a suitable hook 64 to the front end of the tractor. One end of the other chain is connected through a spring 62 to the thill-like frame member 22. The opposite end of this chain is connected by a like hook 64 to the forward end of the tractor.

The transverse supporting members 30 and 32 have fixedly attached thereto a plurality of brackets 70 supporting the flanges of the circular race or track 72. This race 72 is substantially T-shaped in transverse cross sectional area, the flanges of the T forming the outer ring portion and the stem or the web of the T forming an inwardly directed race portion. In addition to the brackets 70 supporting the race 72, a pair of oppositely disposed brackets 74 are supported upon a transverse member 76 spanning the distance between the transverse members 30 and 32 and fixedly attached thereto.

The race 72 supports an internally threaded gear ring 80 that functions as a turn-table for the hoisting device. This internally threaded gear ring 80 is provided with a plurality of brackets 82 supporting bevelled rollers 84 for supporting the gear ring upon the race 72. These rollers 84 engage the race so as to permit easy adjustment of the internally threaded gear ring 80. There are rollers both above and below the web of member 72, so that in the event weight is supplied to the hoist, the gear ring 80 will not tip out of position. It is held by these rollers arranged in pairs, one above and one below the web.

The gear ring 80 also has fixedly attached thereto a pair of brackets 86 having pivotally attached thereto a pair of boom or crane members 90 joined at 92 in any suitable manner, as by rivets, bolts or welding. A pair of hooks 94, one on each side of the outer end of the boom, supports chains 96 attached at 98 to a pair of arms or supports 100 attached in any suitable manner to the gear ring 80, as for example, by brackets 101. These supports 100 are fixedly attached to an internally threaded tubular member 102 receiving a screw 104 journalled in a collar 106 and terminating in a crank arm 108 adapted to be manually adjusted, as shown in Figure 1. Instead of a crank arm 108, a wheel 109, as shown in Figure 2, may be used. The collar 106 is mounted upon a pair of supporting arms 110, pivotally attached to brackets 112 fixedly attached to the gear ring 80.

As may best be seen by referring to Figure 2, arms 110 are attached to one end of a chain 114 having the opposite end attached to the gear ring 80. From this it can readily be seen that by tightening the crank arm 108 shown in Figure 1, the outer end of the boom will be raised, in that the distance from the end of members 110 to the end of members 100 is shortened. This distance may be lengthened by unscrewing the screw 104, thereby dropping the outer end of the boom, and vice versa.

As is clearly shown in Figure 2, the outer end of the boom also supports a clamp 120, having fixedly attached thereto the end of a cable 122 carrying a suitable sheave 124 provided with a hook 126, or any other suitable implement for attaching to the object to be hoisted, and passing over a sheave 128 rotatably mounted upon a suitable pintle near the outer end of the boom. The cable 122 extends to the center of the device, where it passes over a sheave 125 supported by a chain 127 fixedly attached between members 110. The cable 122, after leaving the sheave 125, is wrapped around a drum 130. This drum may be driven in any suitable manner, as will appear more fully from the description that follows.

In the preferred embodiment the motor of the tractor has been utilized as a prime mover for actuating the hoisting device. In the event the hoisting device is attached to an automobile or a truck, it may be feasible to provide a separate prime mover mounted on the hoisting device to drive the hoisting device through its several movements. Such a motor may be a gasoline engine or any other suitable type of engine. An electric motor may be used in the event the hoisting device is to be used where electricity is available.

A shaft 150 driven from the engine has mounted thereon a sprocket wheel 152 driving a chain 154 trained over a sprocket wheel 156 fixedly attached to a stubshaft 158 journalled in a suitable bearing 160. The stubshaft 158 is connected to a square, hollow shaft 162 through a universal knuckle or joint 164. A square shaft 166 has one end projecting into the square, hollow shaft 162 and drives a universal knuckle or joint 168 connected to a grooved pulley wheel 170 mounted on a suitable stubshaft 174 journalled in a universal bearing 172. This stubshaft 174 is also journalled in an eccentric bearing, not shown, adapted to be rotated in a clockwise or a counterclockwise direction, so as to shift the end of the shaft 174 to the right or to the left, as viewed from the operator's seat shown in Figure 1. The end of the shaft 174 carries a conical friction drive member 180 positioned between a pair of bevelled driving discs 182 and 184. These discs are fixedly attached to the drum 130. When the conical drive member 180 is positioned directly between the two bevelled discs, so as to be equally spaced from each of the discs, it is in the neutral position and no movement is transmitted from the engine to the drum 130. If the eccentric bearing is rotated in either a clockwise or a counterclockwise direction, the end of the shaft 174 and with it the conical driving member 180 is actuated to the right or to the left, as viewed from the driver's seat, as shown in Figure 1, so as to cause the conical friction drive member 180 to engage the disc 182 or 184, as the case may be. When the conical friction drive member 180 engages the disc 182, the drum is rotated in one direction and when it engages the disc 184, the drum is driven in the opposite direction. By this arrangement, it is possible to drive the drum in either direction without changing the direction of rotation of the driving mechanism supplying power from the engine to the bevelled disc 182 or 184, as the case may be. When the drum is rotated so as to wind the cable upon the drum, the load is hoisted. When the drum is driven in the opposite direction so as to unwind the cable, the load is lowered, as is well known to those skilled in the art.

The eccentric bearing, not shown, may be rotated in a clockwise direction or a counterclockwise direction by actuating a control mechanism including a lever 190 having forward and rearward movements. The lever 190 is pivotally attached to a bracket 192 supported upon the thill-like member 20. The lever 190 is connected to a rod 194 having one end attached to a bell crank lever 196 having one arm attached to a lever 198 connected to the eccentric bearing not shown. When the lever 190 is pushed forwardly, the eccentric bearing is rotated in one direction from neutral position. When the lever 190 is pulled rearwardly, it actuates the eccentric bearing in the opposite direction. Instead of friction drive mechanism, suitable gear mechanism providing a positive drive could be used.

Suitable brake mechanism, not shown, may be applied to the drum, to hold the drum in any adjusted position and thereby hold the load as desired. This brake mechanism may be so connected that the brakes are automatically applied whenever the power is disconnected from the bevelled discs 182 and 184.

The hoisting device may also be angularly moved by the prime mover. This may be accomplished by the driving mechanism now to be described.

The pulley 170 drives a V-belt 200 passing over a pulley 202 attached to a stubshaft 204 journalled in a bearing 206. The stubshaft drives through a universal coupling unit 205 and a shaft 207 a conical drive member 208 mounted between a pair of bevelled discs 210 and 212 fixedly attached to a shaft 214 keyed to a gear or pinion 216, meshing with the internally directed teeth of the gear ring 80. The eccentric bearing 209 may be rotated in clockwise or counterclockwise direction by oscillating the lever 190 to the right or to the left, as viewed from the driver's seat, and in a direction at right angles to the push-pull direction described above. By oscillating the lever 190 to the right or to the left, a shaft 220 is rotated. This shaft 220 has one end non-rotatably attached to the lever 190 and the opposite end journalled in a bearing 222 and supports a crank arm 224, having attached thereto a rod 226 connected to the eccentric bearing 206. Thus, it is seen that the lever 190 has movements in two directions. When moving in one direction, it controls the lift of the hoist. When moving in the other direction, it controls the swing of the hoist. When the eccentric bearing 206 is rotated, it raises or lowers the end of the shaft 204, so as to engage one of the bevelled disc members 210 or 212.

In the event a light load is to be lifted, the pulley 124 may be dispensed with and the end of the cable 122 connected directly to the load. For heavier loads multiple sheaves or pulleys may be used, so as to multiply the mechanical advantage.

A counterpoise 240, shown in Figure 2, but omitted from Figure 1 for the purpose of clearness, is mounted upon the supporting member 244, which is attached to the gear ring 80 and supported thereon by a bracket 242. The counterpoise 240 is diametrically disposed at all times with respect to the load. This counterpoise has two advantages. It tends to balance the load and it reduces the stresses placed upon the gear ring 80 and the parts associated therewith. Whenever the boom or crane is pointed ahead and aligned with the longitudinal axis of the tractor, the tractor functions as a counterpoise, placed at the ends of the long thill-like members.

When the hoisting device is transported from one place to another or when it is not in use, the boom is preferably rotated so as to be aligned with a boom supporting structure 250 mounted upon the thill-like member 22. This boom supporting structure includes a standard 252 and a diagonally disposed brace 254.

In Figures 5 and 6 a modification has been shown to illustrate the adaptation of the principles described above to a light weight manually manipulated crane or hoist that may be powered with a light weight air cooled gasoline engine or an electric motor when electricity is available. This modification is so designed that it may be taken apart into three separate units, each unit being light enough for a man to transport from one place to another.

The crane is provided with a pair of frame members 260 bent into shape from suitable structural steel tubing, such as round, elliptical or rectangular tubing. This structure simulates the thill-like members described above. Members 260 are telescoped into larger tubular members 262 and held in place by suitable bolts 264 shown in Figure 5. An axle member 266 is supported underneath tubular members 262 by two pairs of long-horned-like members 268. Members 268 are welded to the tubular members 262. The axle 266 has journalled thereon a pair of wheels 270. The center of the axle 266 is supported upon a plurality of diagonally disposed rods 272 underlying a platform or plate 274. The rods 272 are preferably welded, both to the tubular members 262 and to the axle 266. In addition thereto, the rods 272 may have their extreme ends welded to the underside of the platform 274 when this platform is made of metal. The center of the plate 274 is provided with a suitable aperture receiving a tubular standard 276. The standard 276 is provided with a pair of ears 278 welded to the top thereof. Said ears support a pintle or stubshaft 280, having journalled thereon a sheave or pulley 282. The lower end of the standard also has attached thereto a pair of ears 284, supporting a sheave or pulley 286.

The standard 276 supports a collar 290, having pivotally attached thereto a composite telescopically arranged boom assembly 292. Some of the sections of the boom assembly 292 are provided with a plurality of apertures 294, one of which is adapted for registry with an aperture 296 in the adjacent boom member so as to permit the insertion of a bolt or pin through the registering holes to hold the boom members in adjusted position. If it is found desirable to shorten the boom or to lengthen it, it is merely necessary to remove the pin from the registering apertures and adjust the boom sections to cause the proper apertures for the desired length to register.

The upper end of the boom is supported by a pair of chains 300 adjustably attached to the standard 276. A sheave 302, supported in a forked member 304 attached to the upper section of the boom 292, supports a cable or rope 306, provided with a hook or any other suitable attaching means 308 for engaging the object to be lifted. The cable 306, in addition to passing over the sheave 302, passes over the sheaves 282 and 286 and is wrapped or wound upon a suitable drum 310. As will appear more fully later, the drum 310 is driven in either direction by a gas engine 312.

The engine 312 is mounted upon a suitable platform 314 fixedly attached to frame members 260. The platform 314 is provided with a plurality of longitudinally disposed slots 316 permitting adjustment of the engine 312 with respect to the platform 314, to tighten the belt 318 driven by the engine 312. Instead of an engine, an electric motor or any other suitable prime mover could be used.

The V-belt 318 drives one of a series of pulleys 320 and with it the drive shaft 322 journalled in suitable bearings 324, mounted upon the frame members 260. The shaft 322 supports a friction wheel 326 and at the extreme end a series of pulleys 328, one of which is selected to drive a V-belt 330 traveling over one of a series of pulleys 332 fixedly attached to the shaft 334 journalled in a pair of bearings 336 mounted upon the frame members 260. The shaft 334 has mounted thereon a friction wheel 338 in spaced relation from a larger friction wheel or drum 340 attached to the drum 310. The wheels 326 and 338 are aligned with the friction drum 340, but each normally spaced from contact with the drum. In order to drive the drum 310, it has been mounted for adjustment into engagement with a selected friction wheel 326 or 338, as the case may be. One of these friction wheels is used for winding the cable on the drum and the other is used for unwinding the cable from the drum.

The drum 310 is mounted upon an eccentric shaft 350 journalled in suitable bearings, one mounted upon each frame member 260. When this eccentric shaft is rotated in one direction, it advances the drum 310 and with it the friction drum 340 into engagement with the friction wheel 326. When the shaft is rotated in the opposite direction, it moves the drum 310 and with it the friction wheel or drum 340 rearwardly, so as to cause the friction drum 340 to engage the friction wheel 338 so as to be driven thereby. A lever 352 terminating in a collar that is keyed to the shaft 350 is used to oscillate the shaft 350 in either direction.

An automatic brake mechanism is used to hold the drum 310 from rotation when the lever 352 is in neutral position. This brake mechanism will not be described in its entirety; but includes a disc member 360 mounted upon the shaft 350 and keyed thereto, and an idler or cam follower 362 normally seated in the notch in member 360. This cam follower 362 is pivotally mounted upon a movably mounted lever 364 spring urged in the "down" position by a spring 366. As the shaft is rotated to the right, or to the left, as viewed in Figure 6, the disc 360 will force the cam follower 362 out of the notch in the disc 360, which movement releases the brake mechanism mounted within the drum 340. From the foregoing description it can be readily seen that as the lever 352 is moved out of neutral position, it does two things. The movement of this lever automatically releases the brake and at the same time shifts the drum 340 into engagement with one of the friction wheels 326 or 338. By so doing, the drum 310 is rotated either to wind the cable 306 upon the drum to hoist the weight, or, if the lever is moved in the opposite direction, to unwind the cable from the drum to lower the weight. The lever 352 is in handy reach of the operator, who may be seated upon the seat 370 mounted upon a suitable standard 372 fixedly attached to a base 374 and attached to the ends of members 260. Thus, it is seen, that the hoisting device is in easy control of the operator. The operator, being seated upon the seat, functions as a counterpoise. If the operator's weight is not sufficient, sandbags may be placed on the base plate 374, so as to weigh down the end of the crane.

As shown in Figures 5 and 6, the boom is pointed ahead away from the operator. The boom, however, may be rotated with the standard 276 in either direction, so as to lift the load that may be angularly disposed with respect to the longitudinal axis of the frame of the hoisting device.

This has been accomplished by fixedly attaching to the standard 276 a worm gear 380 meshing with a worm 382 mounted upon a shaft 384 journalled in bearings 386, 388 and 390. The shaft 384 is connected through a universal joint 400 to a drive shaft 402 that may be adjusted in length and journalled on a bracket 404. The shaft 402 terminates in a crank 406 within easy reach of the operator. The operator may oscillate the standard 276 and the boom 292 in either direction by rotating the crank 406 in the proper direction. If a rather heavy load is to be raised from one side or the other, it may be found necessary to weight the wheel opposite the boom with sandbags, so as to provide an adequate counterpoise.

For some types of lift, it may be found advantageous to use a number of sheaves to form a tackle block between the boom and the load, the operation of which is well known to those skilled in the art.

The hoisting device shown in Figures 5 and 6 may be disassembled into three units, each of which may be handled by one man and moved from place to place without additional help. Furthermore, the chassis or frame, together with the wheels, may be used as a trailer for light loads, such as boats or light artillery. Furthermore, due to lightness of weight, the assembly may be loaded into an airplane in readiness for use in the event of a wreck or accident. The trailer portion may then be used as a trailer for gliders.

This portable hoisting device may be used for many kinds of work with standard tools or equipment. At times it may be necessary to design special equipment for special work. This hoisting device may be used inside of buildings or factories where the boom may be adjusted to clear the ceiling or doors. When this hoisting device is used in construction work, the length of the boom may be increased so as to attain the desired height. This hoisting device is adaptable for use in handling almost anything that may be handled with a fork, shovel or by hand. It may be used in loading vegetables, hay, straw, cornshocks, fuel, such as wood or coal, tanks of fuel oil, gasoline and the like. It may be used in handling ice and sawdust used in packing ice, in loading and unloading logs and lumber, pulp, fence posts and poles. It may be used on the farm for handling rocks, in mines for handling ores and minerals. In drainage and highway work it may be used for handling tiles, dirt and gravel. The hoist may be used for moving bulky material such as scrap iron, cotton, cotton bales, machinery and the like. In the aircraft industry it may be used in interchanging engines and other heavy parts. Numerous other uses for the device could be enumerated.

Although the preferred modification of the device has been described, it will be understood that within the purview of this invention various changes may be made in the form, details, proportion and arrangement of parts, the combination thereof and mode of operation, which generally stated consist in a device capable of carrying out the objects set forth, as disclosed and defined in the appended claims.

Having thus described my invention, I claim:

1. A hoisting device adapted to be attached to a tractor, said hoisting device including a frame having a pair of thill-like members extending rearwardly on either side of the tractor, means for attaching the rear ends of the thill-like members to the draw-bar of the tractor, a pair of bogie wheels for supporting the frame, said bogie wheels having a greater wheel spread than the wheel spread of the tractor, and hoisting means mounted on said frame, said hoisting means being located ahead of the tractor and including a turn-table mounted above the bogie wheels.

2. A hoisting device of the pusher type adapted to be attached to a tractor, said hoisting device including a frame having a pair of thill-like members extending rearwardly on either side of the tractor, means for attaching the frame to the draw-bar of the tractor, guiding means for attaching the frame to the front end of the tractor, said guiding means maintaining the thill-like members in aligned relation with the tractor, wheels mounted under the frame for supporting the same, and hoisting means mounted on said frame positioned ahead of the tractor, said hoisting means including a turn-table mounted above the bogie wheels.

3. A hoisting device of the pusher type adapted to be attached to a tractor, said hoisting device including a frame having a pair of thill-like members extending rearwardly on either side of the tractor, means for attaching the rear ends of the thill-like members to the draw-bar of the tractor, flexible means for attaching the thill-like members to the front end of the tractor, supporting wheels, means for mounting the wheels under the frame, said means permitting free swinging movement of the wheels and hoisting means mounted over the supporting wheels, said hoisting means including a turn-table.

4. A hoisting device of the pusher type adapted to be attached to a tractor, said hoisting device including a frame having a pair of thill-like members extending rearwardly on either side of the tractor, means for attaching the rear ends of the thill-like members to the draw-bar of the tractor, flexible means for interconnecting the thill-like members to the front end of the tractor, bogie wheels mounted under the frame, said bogie wheels being arranged in spaced relation from the tractor so as to support the frame, and hoisting means mounted on said frame, said hoisting means being located on the frame ahead of the tractor and including a turn-table mounted above the bogie wheels.

5. A hoisting device of the pusher type adapted to be attached to a tractor, said hoisting device including a frame having a pair of thill-like members extending rearwardly on either side of the tractor, means for attaching the frame to the draw-bar of the tractor, guiding means for attaching the frame to the front end of the tractor, said guiding means maintaining the thill-like members in aligned relation with the tractor, wheels mounted under the frame for supporting the same, said frame including a circular race mounted above said wheels, hoisting means mounted upon said race, and means for attaching the hoisting means to the race, said means permitting angular adjustment of the hoisting means upon said race.

6. A hoisting device of the pusher type adapted to be attached to a tractor, said hoisting device including a frame having a pair of thill-like members extending rearwardly on either side of the tractor, means for attaching the frame to the draw-bar of the tractor, guiding means for attaching the frame to the front end of the tractor, said guiding means maintaining the thill-like members in aligned relation with the tractor, wheels mounted under the frame for supporting the same, said frame including a circular track mounted above said wheels, and hoisting means rotatably mounted on said track, said hoisting means including a boom, and means carried by the boom for supporting the body to be lifted.

7. A hoisting device of the pusher type adapted to be attached to a tractor, said hoisting device including a frame having a pair of thill-like members extending rearwardly on either side of the tractor, means for attaching the frame to the draw-bar of the tractor, guiding means for attaching the frame to the front end of the tractor, said guiding means maintaining the thill-like members in aligned relation with the tractor, wheels mounted under the frame for supporting the same, said frame including a circular track mounted above the wheels, hoisting means mounted for rotation upon said track, and driving means driven from the engine of the tractor for rotating the hoisting means upon said track.

8. A hoisting device of the pusher type adapted to be attached to a tractor, said hoisting device including a frame having a pair of thill-like members extending rearwardly on either side of the tractor, means for attaching the frame to the draw-bar of the tractor, guiding means for attaching the frame to the front end of the tractor, said guiding means maintaining the thill-like members in aligned relation with the tractor, wheels mounted under the frame for supporting the same, a drum rotatably mounted upon said frame, said frame including a circular track, hoisting means mounted for rotation upon the track, said hoisting means including a boom and a cable, said cable being attached to the drum so that as the drum is rotated the length of the cable is adjusted, and driving means for optionally driving the drum and for oscillating the hoisting device upon the frame, said driving means being driven from the engine of the tractor.

9. A hoister device of the pusher type adapted to be attached to a tractor, said hoisting device including a frame having a pair of thill-like members extending rearwardly on either side of the tractor, means for attaching the frame to the draw-bar of the tractor, guiding means for attaching the frame to the front end of the tractor, said guiding means maintaining the thill-like members in aligned relation with the tractor, wheels mounted under the frame for supporting the same, said frame including a circular track mounted above the wheels, hoisting means rotatably mounted upon the track, said hoisting means including a boom and a cable, means for adjusting the length of the cable, driving means for interconnecting the engine of the tractor to the cable adjusting means, and control means mounted upon one of the thill-like members, said control means being mounted within reach of the operator of the tractor for controlling the adjustment of the cable.

10. A hoisting device of the pusher type adapted to be attached to a tractor, said hoisting device including a frame having a pair of thill-like members extending rearwardly on either side of the tractor, means for attaching the frame to the draw-bar of the tractor, guiding means for attaching the frame to the front end of the tractor, said guiding means maintaining the thill-like members in aligned relation with the tractor, wheels mounted under the frame for supporting the same, said frame member including a circular track, a hoisting device mounted for rotation upon the track, said hoisting device including a boom and a cable for lifting the load, a drum mounted underneath the track, said cable being attached to said drum, driving means for interconnecting the drum and the hoisting deivce to the engine of the tractor so that the engine of the tractor may be used to actuate the drum and rotate the hoisting device, and control means mounted within reach of the operator of the tractor for controlling the rotation of the hoisting device upon the track and for controlling the rotation of the drum.

11. A hoisting device of the pusher type adapted to be attached to a tractor, said hoisting device including a pair of thill-like frame members extending rearwardly one on each side of the tractor, flexible means for interconnecting said thill-like frame members to the tractor, a pair of transverse frame members, adjustable means for interconnecting said transverse frame members to the forward ends of the thill-like frame members, a pair of bogie wheels, means for attaching the bogie wheels to the transverse frame members, a circular track carried upon said transverse frame members above the bogie wheels, and a hoisting device rotatably mounted upon the track.

12. A hoisting device of the pusher type adapted to be attached to a tractor, said hoisting device including a pair of thill-like frame members extending rearwardly one on each side of the tractor, flexible means for interconnecting said thill-like frame members to the tractor, a pair of transverse frame members, means for pivotally attaching the transverse members to the thill-like members, turnbuckle means for leveling said transverse members, said turnbuckle interconnecting the transverse members to the thill-like members in spaced relation from the pivotal mounting, a circular track, means for interconnecting the circular track to the transverse members, and hoisting means rotatably mounted upon the circular track.

13. A hoisting device of the pusher type adapted to be attached to a tractor, said hoisting device including a pair of thill-like frame members extending rearwardly one on each side of the tractor, flexible means for interconnecting said thill-like frame members to the tractor, a pair of transverse frame members, means for pivotally attaching the transverse members to the thill-like members, turnbuckle means for leveling said transverse members, said turnbuckle interconnecting the transverse members to the thill-like members in spaced relation from the pivotal mounting, a circular track, means for interconnecting the circular track to the transverse members, hoisting means rotatably mounted upon the circular track, said hoisting means including a boom and a cable, means for adjusting the length of the cable, and driving means for interconnecting the engine of the tractor to the cable adjusting means.

14. A hoisting device of the pusher type adapted to be attached to a tractor, said hoisting device including a pair of thill-like frame members extending rearwardly one on each side of the tractor, flexible means for interconnecting said thill-like frame members to the tractor, a pair of transverse frame members, means for pivotally attaching the transverse members to the thill-like members, turnbuckle means for leveling said transverse members, said turnbuckle interconnecting the transverse members to the thill-like members in spaced relation from the pivotal mounting, a circular track, means for interconnecting the circular track to the transverse members, hoisting means rotatably mounted upon the circular track, and driving means for interconnecting the engine to the hoisting device for rotating the hoisting device on the track.

15. A hoisting device of the pusher type adapted to be attached to a tractor, said hoisting device including a pair of thill-like frame members extending rearwardly one on each side of the tractor, flexible means for interconnecting said thill-like frame members to the tractor, a pair of transverse frame members, means for pivotally attaching the transverse members to the thill-like members, turnbuckle means for leveling said transverse members, said turnbuckle interconnecting the transverse members to the thill-like members in spaced relation from the pivotal mounting, a circular track, means for interconnecting the circular track to the transverse members, hoisting means rotatably mounted upon the circular track, driving means for interconnecting the engine to the hoisting device for rotating the hoisting device on the track, and control means within the reach of the operator for controlling the driving means to thereby control the rotation of the hoisting device upon said track.

16. A hoisting device adapted to be attached to a tractor, said hoisting device including a pair of thill-like frame members extending rearwardly one on each side of the tractor, flexible means for interconnecting said thill-like frame members to the tractor, bogie wheels mounted underneath the front end of the thill-like frame members for supporting the same, a circular track, means for interconnecting the circular track to the forward ends of the thill-like frame members, a hoisting device mounted upon the circular track, said hoisting device including a crane angularly disposed with respect to the thill-like frame members, and a counterpoise diametrically disposed with respect to the crane so as to counterbalance the same.

WALTER O. NELSON.